United States Patent [19]

Baker

[11] Patent Number: 5,213,388
[45] Date of Patent: May 25, 1993

[54] ANTI-THEFT VEHICLE SEAT APPARATUS

[76] Inventor: Franklin W. Baker, 1502½ North LaBrea, Inglewood, Calif. 90302

[21] Appl. No.: 767,408

[22] Filed: Sep. 30, 1991

[51] Int. Cl.⁵ .............................................. B60N 2/08
[52] U.S. Cl. .................................. 296/65.1; 248/429; 297/344; 180/287; 70/261; 188/265; 254/DIG. 5
[58] Field of Search ............................ 296/65.1, 68.1; 248/429, 430; 297/344; 180/287; 70/237, 238, 261; 188/265, 353; 303/89; 74/532; 254/DIG. 5

[56] References Cited

U.S. PATENT DOCUMENTS

| | | | |
|---|---|---|---|
| 1,738,769 | 12/1929 | Fry | 254/DIG. 5 |
| 1,877,367 | 9/1932 | Seppmann | 254/DIG. 5 |
| 2,662,728 | 12/1953 | Hanes et al. | 254/DIG. 5 |
| 2,820,626 | 1/1958 | Hedeen | 254/DIG. 5 |
| 3,650,347 | 3/1972 | Campos | 296/65.1 X |
| 4,116,297 | 9/1978 | Ross et al. | 180/287 |
| 4,796,951 | 1/1989 | Tamura et al. | 297/344 X |

FOREIGN PATENT DOCUMENTS

| | | | |
|---|---|---|---|
| 2736782 | 11/1978 | Fed. Rep. of Germany | 70/238 |
| 2587663 | 3/1987 | France | 180/287 |
| 0120548 | 7/1984 | Japan | 70/237 |
| 538508 | 8/1941 | United Kingdom | 248/429 |
| 2102363 | 2/1983 | United Kingdom | 70/261 |

Primary Examiner—Dennis H. Pedder
Attorney, Agent, or Firm—Albert O. Cota

[57] ABSTRACT

An anti-theft vehicle seat apparatus (10) that allows the vehicle seat (90) to be moved from a normal driving position to a forward position. When in the forward position the seat is sufficiently close to the vehicle steering wheel that the vehicle cannot be driven. The apparatus consists of first and second double-sliding track assemblies (12), (14) that move in two increments. The first increment allows the seat to be conventionally placed in a normal driving position and the second allows the seat to be placed in the forward non-drivable position. The invention may be used in combination with a brake compression assembly (60) that includes a seat cavity (62) and a brake compression member (64). The member (64) has a back end (64b) that fits into the cavity (62) and a first end (64a) that has a cavity (64c) sized to encompass the brake pedal. When the vehicle seat (90) is placed in a forward position, the assembly (62) compresses the brake pedal to provide an additional anti-theft safeguard.

7 Claims, 4 Drawing Sheets

POSITION A

POSITION B

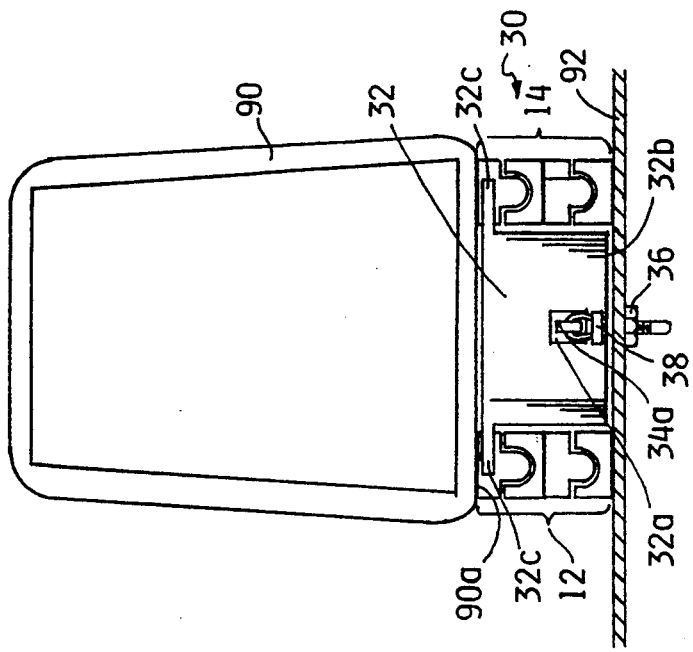
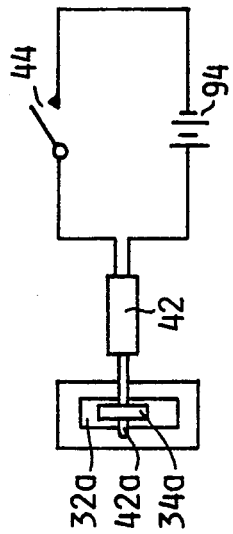
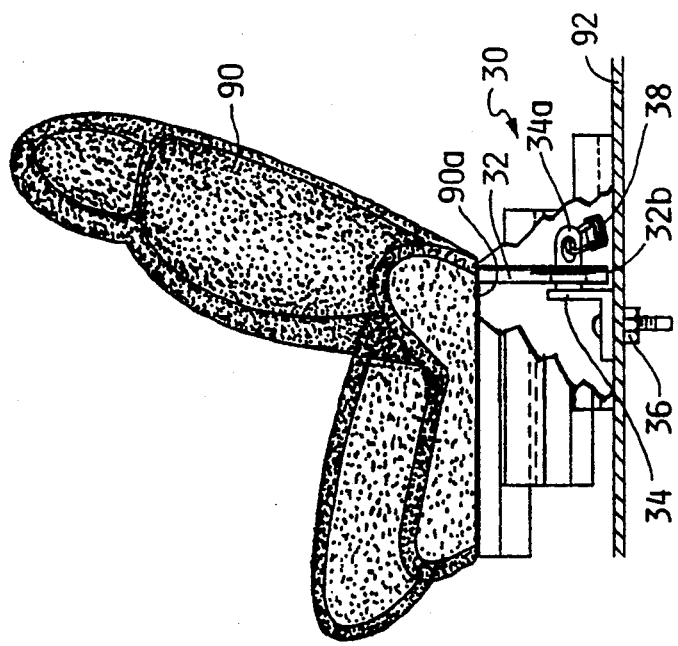
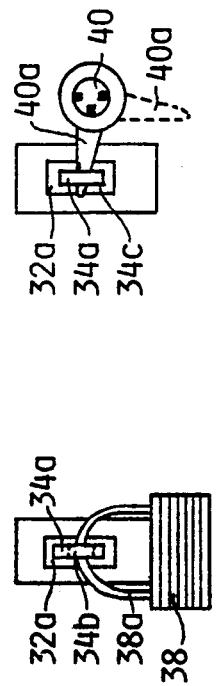
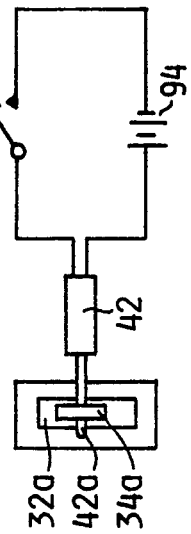

ANTI-THEFT VEHICLE SEAT APPARATUS

TECHNICAL FIELD

The present invention generally relates to vehicle anti-theft apparatuses and more specifically to an apparatus that allows a vehicle driver's seat to be moved from a normal driving position to a more forward position that prevents a driver from sitting on the seat. The invention also includes a brake compression assembly that compresses the brake pedal when the seat is in a forward position.

BACKGROUND ART

In recent years many apparatuses have become available that purport to prevent the unauthorized removal of a motor vehicle. The majority of motor vehicles are being produced with steering wheel locks and other theft preventing devices such as electronic devices with audio and visual alarms, ignition deactivation circuits, hidden fuel cutoff valves, external steering wheel locks and other electrically and mechanically operated latches, brackets and bars that clamp the brakes and/or the steering wheel.

In all of the above, thieves have found ways to bypass these apparatuses and steal the vehicle. For example, electronic alarms and electrical ignition circuits can be shut off and vehicles may be towed from the back when the steering wheel is locked and only the parking brakes are on.

A search of the prior art did not disclose any patents that read directly on the claims of the instant invention however, the following U.S. patents were considered related:

| U.S. PAT. NO. | INVENTOR | ISSUED |
| --- | --- | --- |
| 4,116,297 | Ross, et al | 26 September 1978 |
| 3,650,347 | Campos | 21 March 1972 |
| 3,028,198 | Murr | 3 April 1962 |

The Ross et al patent discloses a vehicle seat lock that locks the forwardly swingable seat back portion of a motor vehicle in a forwardly displaced position in contact with the steering wheel. When the seat back is so displaced, it discourages unauthorized operation of the vehicle. The locking mechanism consists of an elongated extendable and retractable brace that may be locked against retraction.

The Campos patent discloses an automobile safety and anti-theft device consisting of a housing located on the driver's seat between the driver's thighs. The housing contain a key-operated seat lock to lock the driver's seat in a position too close to the steering wheel for a person to occupy the seat. The housing also includes an alarm system that is activated by excessive lurching of the driver's body or attempts to tow away the vehicle by an unauthorized person.

The Murr patent discloses a safety seat catch that latches the seat of an automobile in either a normal driving position or in a forward position. When in the forward position, the seat cannot be occupied so the automobile cannot be driven, thus, preventing the theft of the automobile.

DISCLOSURE OF THE INVENTION

The anti-theft vehicle seat apparatus is designed to prevent the unauthorized removal of a motor vehicle. The basic invention consists of two elements: a double-sliding track assembly and a means for locking the assembly. Additionally, the invention may also be used in combination with a brake compression assembly.

In most conventional vehicles, a pair of single sliding track assemblies are located on the undersurface of the vehicle seat. These conventional assemblies are designed to provide limited longitudinal movement. However, the movement is normally sufficient to allow various sizes of drivers to sit on the seat and operate the vehicle. In the Applicant's invention, the pair of single sliding track assemblies are replaced with a pair of the double-sliding track assemblies. The use of a double sliding track allows the seat to be placed and locked in a normal driving position and also allows the seat to be moved to a further forward position. In this further forward position, the seat is sufficiently close to the steering wheel that even a small driver cannot sit on the seat to drive the vehicle.

The double sliding track assembly consists of an upper sliding track assembly having a top section and a bottom section and a lower sliding track assembly also having a top section and a bottom section. The top section of the upper assembly is rigidly attached to the undersurface of the vehicle seat and the bottom section of the upper sliding track assembly is rigidly attached to the vehicle floorboard. To complete the integrated assembly, the bottom section of the upper assembly is rigidly attached to the top section of the bottom assembly.

The inventive double track design allows the movement of the seat to occur in two increments: the first when the upper assembly top section moves with respect to its bottom section and the second increment when the rigidly attached combination of the upper assembly bottom section and lower assembly top section move together with respect to the bottom section of the lower assembly. The first increment allows normal seat positioning and the second allows the seat to be placed in its non-drivable locked position.

The break compression assembly provides the invention with a further anti-theft safeguard. The assembly consists of two items, a seat cavity that is located near the front undersurface of the vehicle seat and a brake compression member. The break compression member has a back end that is sized to fit into the seat cavity and a first end that has a brake cavity sized to encompass the break pedal. The member also includes a length adjusting means and a flexible joint to compensate for any alignment discrepancies. When the vehicle seat with the attached break compression assembly is moved to its most forward position, the break compression member compresses the brake pedal to lock the vehicle brakes.

In view of the above disclosure, it is the primary object of the invention to provide an anti-theft apparatus that allows the vehicle seat to be placed in such a forward position that a driver cannot sit on the seat to drive the vehicle.

It is a further object of the invention to add to the anti-theft function by including a break pedal compression member that compresses on the brake pedal when the seat is placed in a forward position.

It is also an objective of the invention to provide an anti-theft apparatus that:
is reliable and easily maintained,
can be placed in operation by any driver, can be used as an add-on to an existing vehicle or can be included as original equipment, and is cost effective from both a consumer and manufacturers point of view.

BRIEF DESCRIPTION OF THE DRAWINGS

FIG. 2 also shows a second locking assembly that locks the apparatus in the forward non-drivable position.

FIG. 6 is a side elevational view showing the preferred first locking assembly that utilizes a seat lockplate in combination with a latch plate to lock the apparatus in the forward non-drivable position.

FIG. 7 is a back elevational view of the first locking assembly shown in FIG. 6.

FIG. 8 is a front view of a hasp lock that is used to secure the seat lockplate of FIG. 6.

FIG. 9 is a front view of a keylock that is used to secure the seat lockplate of FIG. 6.

FIG. 10 is a front view of a an electrical solenoid and circuit that is used to secure the seat lockplate of FIG. 6.

FIG. 11 also shows a locking assembly and a brake compression assembly that is applicable to both the preferred and second embodiment.

BEST MODE FOR CARRYING OUT THE INVENTION

Figure 1:
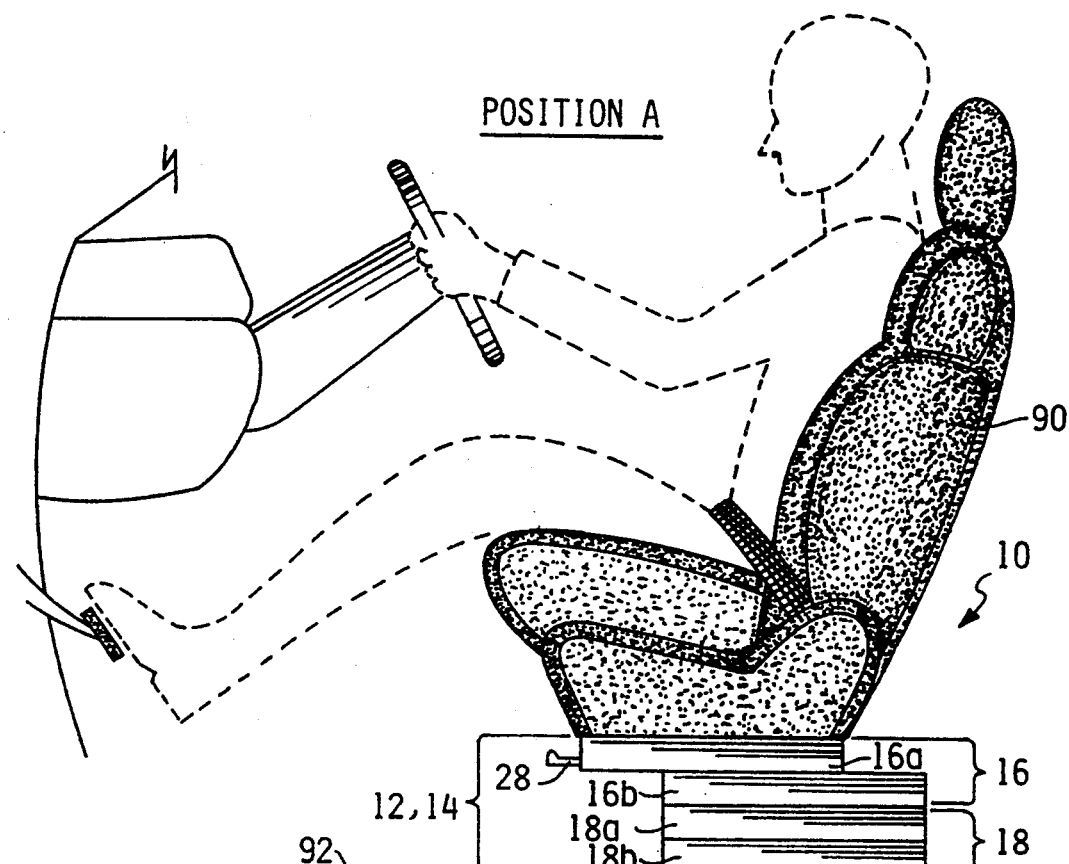
FIG. 1 is a side elevational view showing the preferred embodiment of the anti-theft vehicle seat apparatus positioned in a normal driving position.

The best mode for carrying out the invention is presented in terms of a preferred and a second embodiment. Both embodiments of the anti-theft vehicle seat apparatus are primarily designed to prevent the unauthorized removal of a vehicle.

The preferred embodiment is comprised of the following major elements: a first double-sliding track assembly 12, a second double-sliding track assembly 14, where each assembly consists of an upper sliding track assembly 16 and a lower sliding track assembly 18, a locking and releasing assembly 24, a first locking assembly 30, a second locking assembly 50, a brake compression assembly 60 and a single sliding track assembly 70 that is applicable to the second embodiment. The above inventive elements operate in combination with an existing vehicle seat 90, a floorboard 92, a vehicle battery 94 and a break pedal 96.

Figure 2:
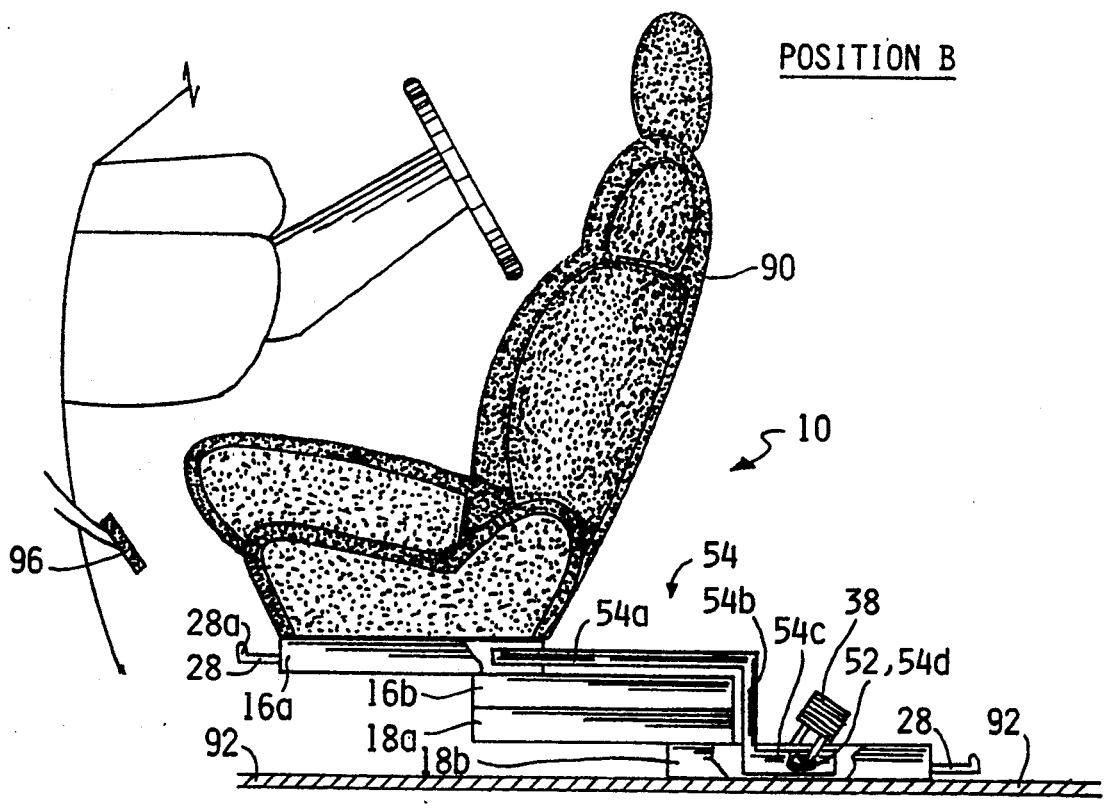
FIG. 2 is a side elevational view showing the anti-theft vehicle seat apparatus in its most forward position that prevents a driver from sitting on the vehicle seat.

The preferred embodiment of the anti-theft vehicle seat apparatus 10 is shown in FIGS. 1-12. As shown in FIG. 1, the apparatus 10 allows the vehicle seat 90 to be slid in a forward direction to a position A which corresponds to a normal driving position; or as shown in FIG. 2, the seat can be slid further forward to a position B where a driver is precluded from sitting on the seat 90. Thus, the car cannot be driven away.

Figures 3, 4:
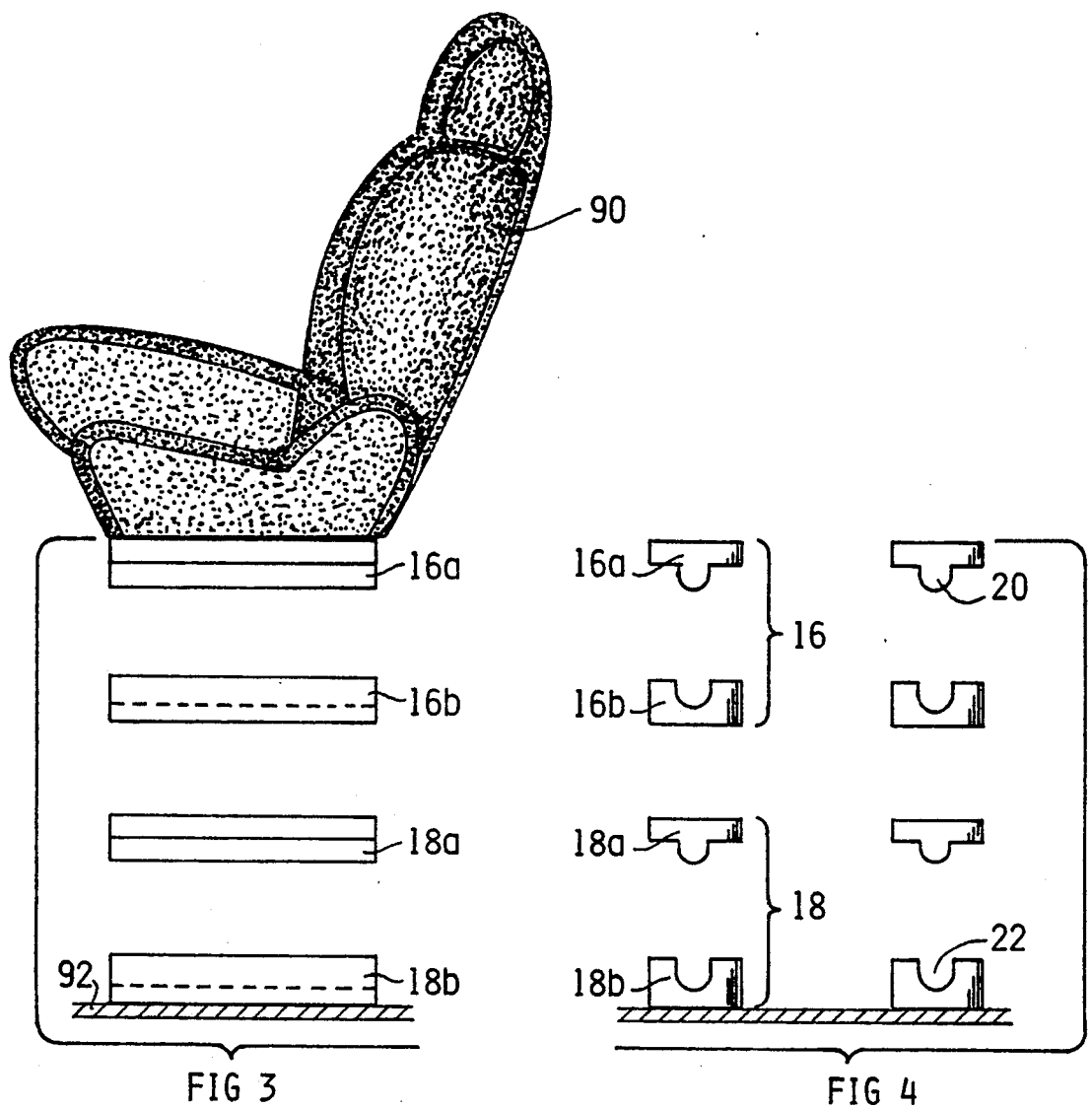
FIG. 3 is a side elevational view showing the separate elements that make-up the double sliding track assembly.
FIG. 4 is a front elevational view of the FIG. 3 elements.

In its basic configuration, the apparatus consists of at least one double-sliding track assembly However, preferably a first double sliding track assembly 12 and a second double sliding track assembly 14 are employed. As shown in FIG. 4, the first assembly 12 is located near the right longitudinal edge of the seat 90 and the second assembly 14 is located near the seat's left longitudinal edge. Both the first and second assemblies 12,14 consist of an upper sliding track assembly 16 that further consists of a top section 16a and a bottom section 16b. The top section 16a is longitudinally and rigidly attached to the undersurface of the vehicle seat 90 and the bottom section 16b is designed to slide along the top section 16a.

The lower sliding track assembly 18 also includes a top section 18a and a bottom section 18b. The bottom section 18b is rigidly attached to the vehicle floorboard 92 as shown in FIGS. 1 and 2, and the top section 18a is designed to slide along the bottom section. The upper surface of the bottom section 18a is in alignment and rigidly attached to the lower surface of the upper section 16b as shown in FIGS. 1 and 2.

Note that since the bottom section 16b is rigidly attached to the upper section 18a, the longitudinal movement of the seat 90 is accomplished in a maximum of two increments; the first increment occurs when the top section 16a moves forward or backward with respect to the bottom section 16b and the second increment occurs when the rigid combination of the bottom section 16b and top section 18a together move with respect to the bottom section 18a. The maximum forward seat position B, as shown in FIG. 2, is only used when the vehicle is to be protected from an unauthorized removal.

The basic configuration of the upper and lower sliding track assemblies 16, 18 as shown in FIG. 4, consist of a top section 16a, 18a having a rail 20 that extends downwardly and a bottom section 16b, 18b that have an upwardly facing rail channel 22 that slidably accepts the rail 20.

Figure 5:
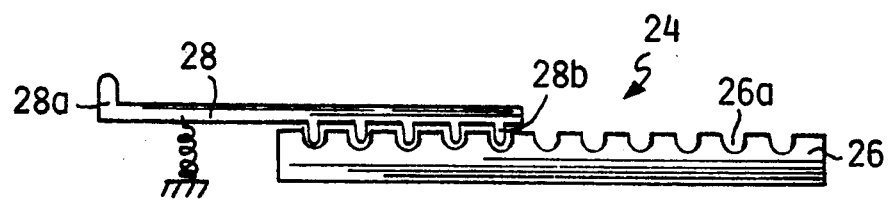
FIG. 5 is a typical means that is used for releasing and locking the sliding track assemblies.

The sliding distance of the top section 16a of the upper sliding track assembly 16 and/or the top section 18a of the lower sliding track assembly 18 is controlled by a releasing and locking means that preferably consists of a locking and releasing assembly 24 as shown in FIG. 5. The assembly consists of a rod 26 having a multiplicity of notches 26a and a rod engaging arm 28 having a handle 28a and an equal multiplicity of notch engaging fingers 28b. The arm 28 is normally biased in its engaged position by a spring 28c. The rod 26 is longitudinally attached to the structure of the bottom section 16b or the upper section 18a and the arm 28 is rotatably and respectivelly attached to the upper section 16a or the lower section 18b. As shown in FIGS. 1 and 3, the assembly 16 is positioned so that the arm 28 that controls the upper sliding track assembly 16 extends from the front of the seat 90 and the assembly controlling the lower sliding track assembly 18 is positioned so that it extends from the rear of the seat.

The basic utility of the invention is dependent upon the ability to lock the upper sliding track assembly 16 to the lower sliding track assembly 18 when the seat has been moved to the non-drivable position B as shown in FIG. 2. Two means for accomplishing the locking function are presented.

The preferred means as shown in FIGS. 6-10 consists of a first locking assembly 30 that further consists of a seat lockplate 32 and a latch plate 34. The lockplate is sized to substantially cover a back opening located behind the seat 90. This opening vertically encompasses the bottom of the seat 90a to the floorboard 92 and horizontally between the inside edges of the first and second double sliding plate assemblies 12, 14. The plate 32 has a latch receiving slot 32a that is located centrally above its lower edge 32b. On each end of its upper section is located an outwardly extending mounting tab 32c. These tabs are attached by an attachment means, to the respective outward back edge of each top section 16a on the first and second upper sliding track assemblies 12, 14.

The latch plate 34 has an outwardly extending latch 34a that includes a lock slot 34b. The lock slot as shown best in FIGS. 6 and 7, is sized to extend through the latch receiving slot 32a on the lockplate 32. The latch plate 34 is rigidly secured to the floorboard 92 by an attaching means that preferably consists of a nut and bolt combination 36 as shown in FIGS. 6 and 7.

To secure the latch 34 to the lockplate 32 several lock means may be employed. As shown in FIG. 8, a hasp lock 38 may be used where the hasp is placed through the lock slot 34b. In FIG. 9 is shown a second locking means that employs a keylock 40 that has a key movable latch 40a. In this case, in lieu of a lock slot 34b, a latch notch 34c would be used to receive the movable latch 40a. The third and final locking means as shown in FIG. 10, consists of an electrical solenoid 42 that is powered and energized by the vehicle battery 94 when a switch 44 is closed. The solenoid 42 is positioned on the seat lockplate 32 so that when the solenoid is energized, the solenoid rod extends into the lock slot 34b on the latch plate 34.

The second method for locking the upper and lower sliding track assemblies 16, 18 in position B, is accomplished by a second locking assembly 50 as shown in FIG. 2. This second assembly 50 functions with a first lock bore 52 that extends horizontally through and near the end of the bottom section 18b of the lower sliding track assembly 18.

The assembly 50 consists of a locking clamp 54 consisting of a forwardly extending upper bar 54a that extends into the rail channel 22 of the upper section 16a of the upper sliding track assembly 16. Extending integrally downward is a bar 54b that connects the upper bar 54a with a backwardly extending lower bar 54c that fits into the channel 22 of the bottom section of the lower sliding track assembly 18. Near the end of the lower bar 54c is located a horizontal second lock bore 54d that is in alignment with the first lock bore 52. To secure the locking clamp 54, the hasp of a lock 38 is placed through the two bores 52 and 54d. When so secured, the seat cannot be moved from its forward non-drivable position.

Figure 12:
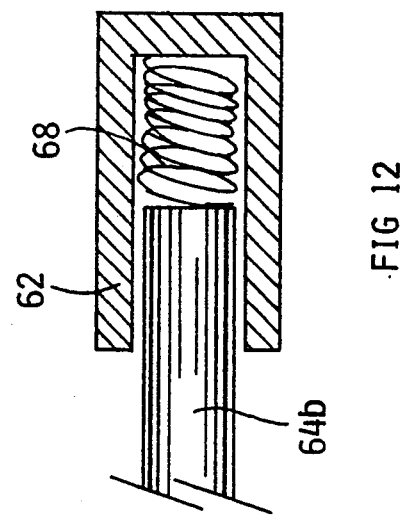
FIG. 12 is a side elevational view of a brake compression assembly that includes a spring that produces an outward force.
Figure 11:
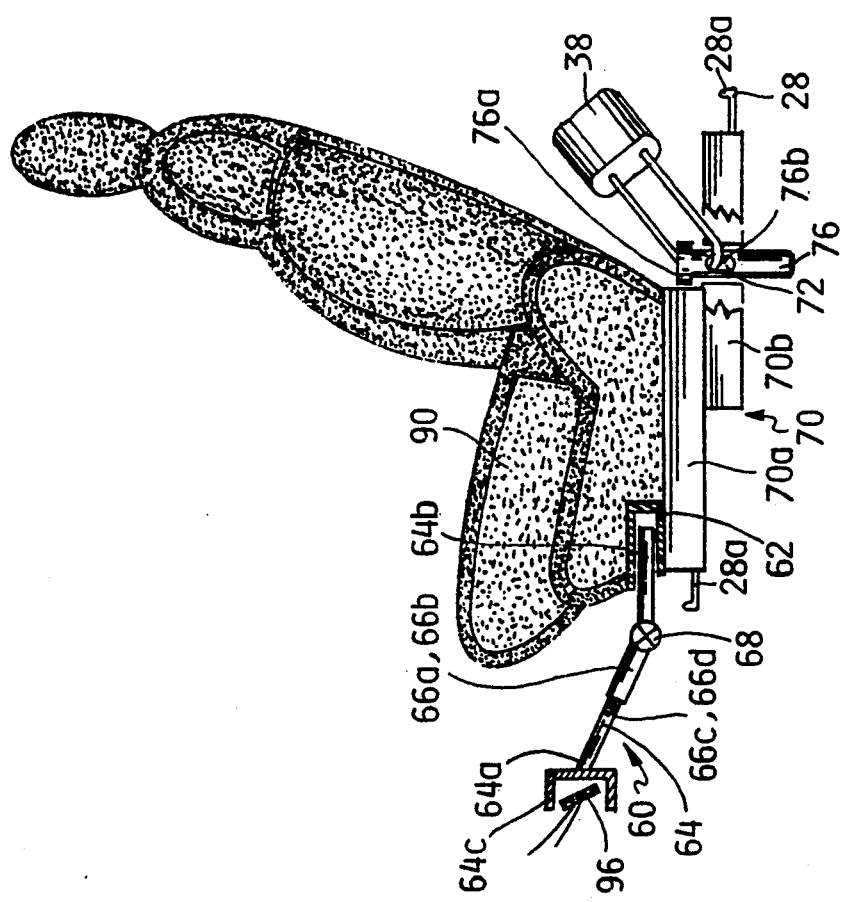
FIG. 11 is a side elevational view showing the second embodiment of the anti-theft vehicle seat apparatus in its most forward position that prevents a driver from sitting on the vehicle seat.

To further enhance the utility of the anti-theft vehicle seat assembly 10 a brake compression assembly 60 may be added. The assembly 60 as shown in FIGS. 11 and 12 is positioned to compress the vehicle brake pedal 96 when the vehicle seat 90 is placed in its most forward position. The assembly 60 to function, utilizes two structural members and requires that a means be provided to lock the seat in its most forward position as previously described.

The first member consists of a seat cavity 62 that is located on the undersurface of the seat 90 as shown in FIG. 11. The cavity should be in substantial alignment with the vehicle brake pedal 96. The second member is a brake compression member 64 that has a first end 64a and back end 64b. The front end has a brake pedal cavity 64c that is sized to cover the brake pedal 96. The back end is sized to slidably fit into the seat cavity 62. To compensate for various lengths, the brake compression member 64 may be made with a length adjusting means 66. One such means includes a brake compression member that is made in two section; a first section 66a having a set of female threads 66b and a second section 66c that has a set of complimentary male threads 66d that are adjustably threaded into the female threads as required to extend or shorten the length of the brake compression member 64.

To further compensate for misalignment discrepancies, a flexible joint 68 may be included in the compression member 64 as shown in FIG. 11. Also as shown in FIG. 12, a spring 68 may be rigidly attached to the back end 64b of the brake compression member 64. When the member with the spring is inserted in the seat cavity 62 an additional outward force is provided. Although the brake compression member 60 is particularly suited to be used with the present anti-theft vehicle seat apparatus 10, it can also be used as a separate entity with any vehicle seat.

The second embodiment of the invention covers an anti-theft vehicle apparatus 10 that functions with at least one single sliding track assembly 70 that includes a top section 70a and a bottom section 70b. The top section 70a is rigidly attached to the undersurface of the vehicle sat 90 and the bottom section is rigidly attached to the floorboard 92 and slides along the top section. The assembly 70 is designed to allow the upper section to slide to a normal driving position and to a further forward position B where a driver is precluded from sitting on the seat 90. A locking and releasing assembly 24 is provided to adjust the sliding distance. This assembly differs in that a handle 28a is provided at each end of the assembly so that the assembly can be manipulated from either end.

A means to lock the top section 70a to the bottom section 70b when the seat is in its non-drivable position is provided. This means may consist of a lock bore 72 that extends horizontally through the bottom section 70b. The bore is positioned near the end of the upper section of the sliding track assembly 70 as shown in FIG. 11. A pin bore 74 in alignment with the lock bore 72, is extended through the vehicle floorboard 92. to complete the locking means, a lock pin 76 is procured that has a head 76a and a horizontal slot 76b therethrough. The pin is sized to drop into the pin bore 74. When so dropped, the pin head 76a is located near the end of the top section 70a and the lock bore 72 and horizontal slot 76b are in alignment to allow a lock 38 to be inserted through the two bores to prevent the seat 90 from being moved from its forward non-drivable position.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

I claim:

1. An anti-theft vehicle seat apparatus comprising:

a) a vehicle having a floorboard and a vehicle seat,
b) a double sliding track assembly at each of the right and left sides of the seat. where each said assembly comprises:
  (1) an upper sliding track assembly having a top section that is longitudinally and rigidly attached to said vehicle seat and a bottom section that slides along said top section,
  (2) at least one lower sliding track assembly having a bottom section that is rigidly attached to the vehicle floorboard and a top section that slides along said bottom section and that is in alignment and rigidly attached to the bottom section of said upper sliding track assembly,
c) means for releasing and locking the top section of said upper sliding track assembly in a forward position,
d) means for releasing and locking the top section of said lower sliding track assembly in a forward position when the seat has been moved to a non drivable position,
e) a rigid joint between said upper sliding track assembly and said lower sliding track assembly on each of said double sliding track assemblies,
f) a seat lockplate sized to substantially cover a back opening that vertically encompasses a seat bottom to the floorboard and horizontally between inside edges of the double sliding track assembly, said lockplate having a latch receiving slot centrally located above a lower edge, said lockplate further comprising an outwardly extending mounting tab, attached, to the respective outward back edge of each upper sliding track top section,
g) a latchplate having an outwardly extending latch and said latch having a lock slot therethrough, said latch sized to extend through the latchplate receiving slot on said seat lockplate, said latchplate rigidly secured to the floorboard, and
h) a locking means for securing the latch to said seat lockplate.

2. An anti-theft vehicle seat apparatus comprising:
a) a vehicle having a floorboard and a vehicle seat,
b) a double sliding track assembly at each of the right and left sides of the seat, where each said assembly comprises:
  (1) an upper sliding track assembly having a top section that is longitudinally and rigidly attached to said vehicle seat, and a bottom section that slides along said top section,
  (2) at least one lower sliding track assembly having a bottom section that is rigidly attached to the vehicle floorboard and a top section that slides along said bottom section and that is in alignment and rigidly attached to the bottom section of said upper sliding track assembly,
c) means for releasing and locking the top section of said upper sliding track assembly in a forward position,
d) means for releasing and locking the top section of said lower sliding track assembly in a forward position when the seat has been moved to a non drivable position to preclude car theft,
e) a rigid joint between said upper sliding track assembly and said lower sliding track assembly on each of said double sliding track assemblies,
f) a seat lockplate sized to substantially cover a back opening that vertically encompasses a seat bottom to the floorboard and horizontally between inside edges of the double sliding track assemblies, said lockplate having a latch receiving flot centrally located above a lower edge, said lockplate further comprising an outwardly extending mounting tab, attached, to the respective outward back edge of each upper sliding track top section,
(g) a latchplate having an outwardly extending latch and said latch having a lock slot therethrough, said latch sized to extend through the slot on said seat lockplate, said latchplate rigidly secured to the floorboard, and
(h) a locking means for securing the latch to said seat lockplate, and
(i) a keylock having a key movable latch that moves into the lock slot on said latchplate when said keylock is placed in its locked position.

3. An anti-theft vehicle seat apparatus comprising:
a) a vehicle having a floorboard and a vehicle seat,
b) a double sliding track assembly at each of the right and left sides of the seat where each said assembly comprises:
  (1) an upper sliding track assembly having a top section that is longitudinally and rigidly attached to said vehicle seat, and a bottom section that slides along said top section,
  (2) at least one lower sliding track assembly having a bottom section that is rigidly attached to the vehicle floorboard and a top section that slides along said bottom section and that is in alignment and rigidly attached to the bottom section of said upper sliding track assembly,
(c) means for releasing and locking the top section of said upper sliding track assembly in a forward position,
(d) means for releasing and locking the top section of said lower sliding track assembly in a forward position when the seat has been moved to a non drivable position to preclude car theft wherein said upper sliding track assembly allows the seat to be adjusted in a forward direction to a position (A), which corresponds to a normal driving position and where said lower sliding track assembly allows the seat to slide in a further forward direction up to a position (B), where a driver is precluded from sitting on the seat and,
(e) a brake compression assembly that is positioned to compress the vehicle brake when the vehicle seat is placed and locked in the forward position (B), where the driver is precluded from sitting, said brake compression assembly comprising:
  1) said seat having a seat cavity located on a forward surface thereof in substantial alignment with the vehicle brake pedal, and
  2) a brake compression member having a front end and a back end, with the front end further comprising a brake pedal cavity sized to cover a vehicle brake pedal and the back end is sized to slideably fit into said seat cavity, such that when said seat is placed and locked in a forward position, (B) said brake compression member compresses the vehicle brake pedal to lock the vehicle wheels to prevent the vehicle from being moved.

4. The apparatus as specified in claim 3 wherein said brake compression member has a length adjusting means.

5. The apparatus as specified in claim 4 wherein said length adjusting means comprises a brake compression member made in two sections, a first section having a set of female threads and a second section having a set of complimentary male threads that are adjustably threaded into the female threads.

6. The apparatus as specified in claim 5 wherein said compression member further comprises a flexible joint that allows said member to correct for any misalignment discrepancy.

7. The apparatus as specified in claim 3 further comprising a spring rigidly attached to the back end of said break compression member, where when said member with said spring is inserted into said seat cavity an outward force is produced.

* * * * *